(12) United States Patent
Kelley et al.

(10) Patent No.: US 7,328,035 B2
(45) Date of Patent: Feb. 5, 2008

(54) METHOD AND APPARATUS FOR REDUCING PAGING-RELATED DELAYS

(75) Inventors: Sean S. Kelley, Hoffman Estates, IL (US); John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 515 days.

(21) Appl. No.: 10/614,942

(22) Filed: Jul. 8, 2003

(65) Prior Publication Data

US 2005/0009548 A1   Jan. 13, 2005

(51) Int. Cl.
   *H04B 7/00*   (2006.01)
(52) U.S. Cl. ............... 455/518; 455/519; 370/312
(58) Field of Classification Search ........... 455/422.1, 455/445, 417, 69, 519, 31.3, 518, 67.16, 455/343.1, 343.2; 370/328, 491, 312
   See application file for complete search history.

(56) References Cited

U.S. PATENT DOCUMENTS

| 5,937,345 | A | 8/1999 | McGowan et al. |
| 6,424,835 | B1 | 7/2002 | Shin |
| 6,519,239 | B1 | 2/2003 | Panchal et al. |
| 6,822,973 | B2 | 11/2004 | Kelley et al. |
| 2003/0008657 | A1* | 1/2003 | Rosen et al. ............... 455/452 |
| 2003/0099214 | A1* | 5/2003 | Schmidt et al. ............ 370/328 |
| 2004/0121791 | A1* | 6/2004 | May et al. ................. 455/519 |
| 2005/0043022 | A1* | 2/2005 | Okon et al. ............. 455/422.1 |

* cited by examiner

*Primary Examiner*—Nay Maung
*Assistant Examiner*—Dominic E. Rego

(57) ABSTRACT

In general, paging-related delays are reduced by empowering an idle mobile (120) to initiate a transition to semi-dormant, unslotted mode, and/or RSCI modes, based on triggers (304) known to the MS. This is an efficient manner (in terms of both RF and battery-life cost considerations) in which to use semi-dormant and RSCI modes (306). If the MS (120) is able to anticipate a paging channel (PCH) message (for example, after sending or receiving an SMS or presence update), then the MS can intelligently reduce its slot cycle index for a short period of time, sacrificing a small amount of battery life, when the R-SCI is most likely to deliver improved service. Moreover, if the MS is low mobility (i.e. low idle handoff rate), then the MS can transition to a semi-dormant mode with very little cost, since it will not need to send many radio environment reports.

39 Claims, 5 Drawing Sheets

METHOD AND APPARATUS FOR REDUCING PAGING-RELATED DELAYS

REFERENCE(S) TO RELATED APPLICATION(S)

This application is related to a application entitled "METHOD AND APPARATUS FOR REDUCING PAGING-RELATED DELAYS FOR ANTICIPATED TARGET MOBILE STATIONS", filed on even date herewith, and assigned to the assignee of the present application.

This application is related to a application entitled "A METHOD FOR SIGNALING BASED ON PAGING CHANNEL LOADING", filed on even date herewith, and assigned to the assignee of the present application.

This application is related to a application, 10/349728, entitled "A DISPATCH CALL SETUP METHOD", filed Jan. 22, 2003, and assigned to the assignee of the present application.

This application is related to a application, Ser. No. 09/928129, entitled "METHOD AND APPARATUS TO SHORTEN CALL-SETUP TIME," filed Aug. 10, 2001, which is assigned to the assignee of the present application.

This application is related to a application, Ser. No. 10/413231, entitled "METHOD AND APPARATUS FOR EFFICIENT CHANNEL ASSIGNMENT," filed Apr. 14, 2003, which is assigned to the assignee of the present application.

This application is related to a application, Ser. No. 10/323428, entitled "CALL SETUP FOR A MOBILE PACKET DATA DISPATCH NETWORK," filed Dec. 18, 2002, which is assigned to the assignee of the present application.

This application is related to a application, Ser. No. 10/303255, entitled "A METHOD FOR EXPEDITING TRANSITIONS BETWEEN STATES OF OPERATION IN COMMUNICATIONS EQUIPMENT," filed Nov. 25, 2002, which is assigned to the assignee of the present application.

This application is related to a provisional application, Ser. No. 60/431880, entitled "APPARATUS AND METHOD FOR PERFORMING RADIO ENVIRONMENT REPORTING ON A REVERSE COMMON SIGNALING CHANNEL," filed Dec. 9, 2002.

This application is related to a provisional application, Ser. No. 60/448343, entitled "APPARATUS AND METHOD FOR IMPLEMENTING A REDUCED SLOTTED MODE IN A COMMUNICATION SYSTEM," filed Feb. 18, 2003.

FIELD OF THE INVENTION

The present invention relates generally to wireless communication systems and, in particular, to reducing paging-related delays therein.

BACKGROUND OF THE INVENTION

In wireless communication systems, mobile units or devices operate on batteries. To conserve power, these mobile units go inactive/idle/dormant on the wireless channels after a short period of non-usage. For data services this period is usually 30 to 60 seconds. Therefore, in push-to-talk calls using the wireless data services, both the originating and terminating mobile units must be transitioned to an active state (actually using wireless resources) as part of the call setup prior to enabling the push-to-talk communication. Once a mobile unit is in the active state, a wireless channel has been established and the mobile unit is able to transmit and/or receive data. As known in the art, push-to-talk call applications include transmission of voice and associated signaling data, but advances in packet data networks extend push-to-talk call applications to include images, streaming video, text messaging, stored audio files, and other multimedia.

For typical push-to-talk call applications, the time required for transitioning an originating mobile unit from a dormant/idle state to the active state can be more than 3 seconds in current implementations. An equal or greater amount of time is required to transition the terminating mobile unit from the dormant to active state, including additional time to actually page the mobile device, as is known in the art. These times do not include transmission time over the air or call processing time required by the dispatch controllers. As a result, for the push-to-talk function total delay times experienced by the originating mobile unit may be 8 seconds or greater.

With long call setup times, the advantages of the push-to-talk service as an instant communications method is diminished. In fact, with call setup times of 8 seconds or longer, the service may be non-viable in the marketplace. For instance, users may prefer to simply use cellular, rather than holding down their PTT button.

A similar problem exists for group palls in the push-to-talk mode. Call setup times may be even longer since there are multiple terminating mobile units to connect to the originating mobile unit. Although some of the processing time for each of the terminating or target mobile units may overlap, the total call setup time is even greater than the individual-to-individual call. Therefore, group calls pose an even greater problem for the push-to-talk function in a packet data network.

As previously mentioned, paging the mobile units involves significant delay. The radio access network (RAN) may need to first locate the MS using a page/page response exchange, which typically takes 400+ms. Also, when a base transceiver station (BTS) attempts to page a mobile, it must wait for the appropriate paging channel (PCH) slot to send a message to the MS operating in slotted mode. This is known as the "slot cycle delay," which can be up to 5.12 seconds for a Slot Cycle Index (SCI) value of 2. In addition, page messages can be dropped during periods of high PCH loading. Typically, the recovery mechanism is for the source of the message to resend after a lengthy timeout. Moreover, some of these paging-related delays impact other instant messaging services in addition to PTT, such as short message service (SMS).

Accordingly, it would be highly desirable to have a method and apparatus for substantially decreasing paging-related delays in wireless systems.

DETAILED DESCRIPTION OF EMBODIMENTS

In general, paging-related delays are reduced by empowering an idle mobile to initiate a transition to semi-dormant, unslotted mode, and/or RSCI modes, based on triggers known to the MS. This is an efficient manner (in terms of both RF and battery life cost considerations) in which to use semi-dormant, unslotted mode, and RSCI modes. If the MS is able to anticipate a paging channel (PCH) message (for example, after sending or receiving an SMS or presence update), then the MS can intelligently reduce its slot cycle index for a short period of time, sacrificing a small amount of battery life, when the RSCI is most likely to deliver improved service. This saves approximately 4 seconds of paging latency (for SCI 2 to SCI 0) and also reduces the probability of a PCH message being dropped, since there are more opportunities to deliver a message to the MS.

In general, if the MS is low mobility (i.e. low idle handoff-rate), then the MS can transition to-a semi-dormant mode With very little cost, since it will not need to send many radio environment reports. The MS can transition to semi-dormant if it is low mobility and able to anticipate a paging channel message, or alternatively, it can transition to semi-dormant mode based solely on low mobility. 400+ms of paging latency can be saved by operating in this manner. Also, the probability of a PCH message being dropped is reduced, since there are fewer pages.

The present invention encompasses a method for reducing paging-related delays in which an MS determines that at least one condition from the group consisting of a low mobility condition and an active user messaging condition is present for the MS. The MS then transitions, as triggered by the presence of the at least one condition, to at least one operational mode in which paging-related delays for the MS are reduced.

The present invention also encompasses an MS apparatus that includes a transmitter, a receiver; and a processor, coupled to the transmitter and the receiver. The processor is adapted to determine that at least one condition from the group consisting of a low mobility condition and an active user messaging condition is present for the MS. The processor is further adapted to transition, as triggered by the presence of the at least one condition, to at least one operational mode in which paging-related delays for the MS are reduced.

Figure 1:
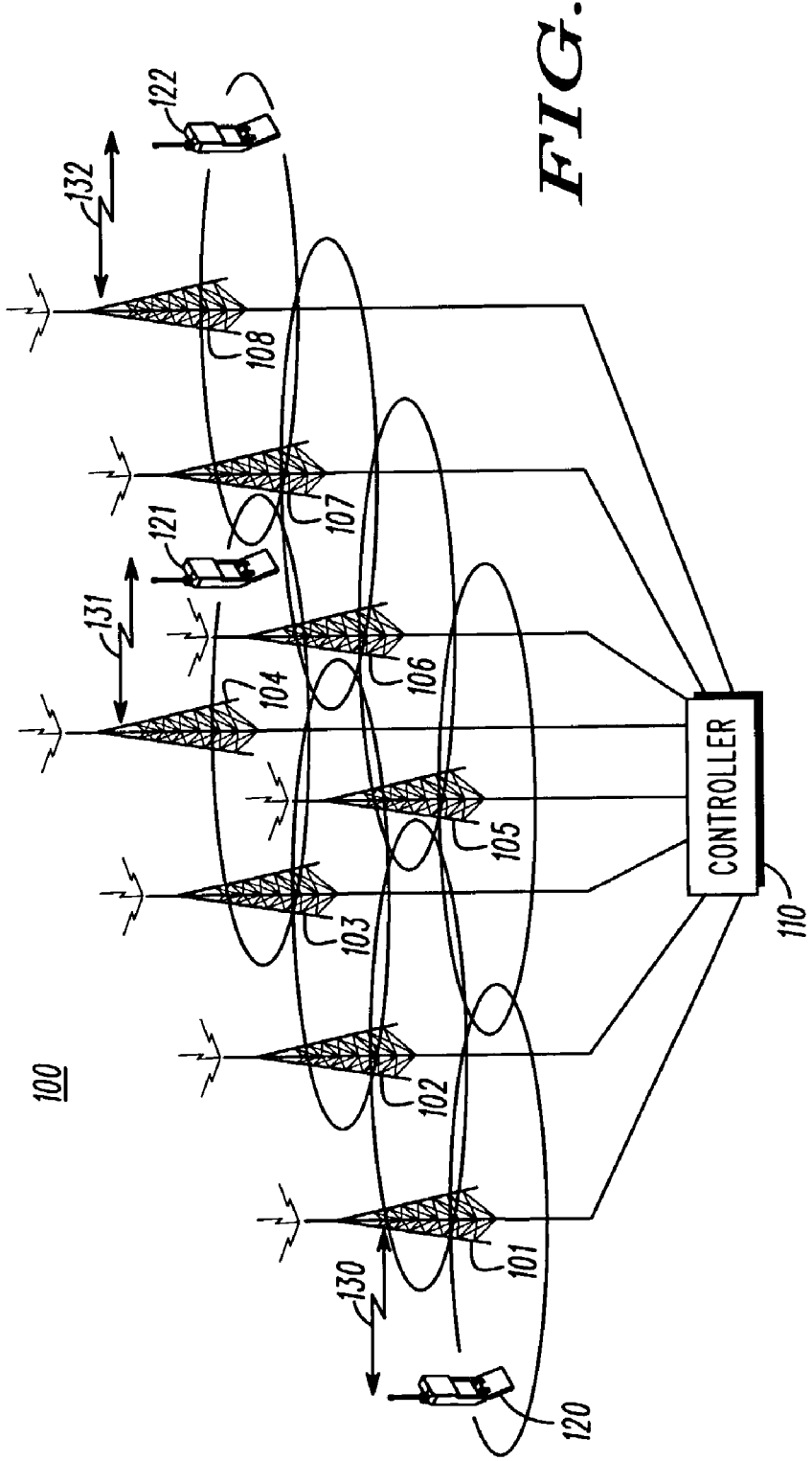
FIG. 1 is a depiction of a communication system in accordance with a first embodiment of the present invention.

The disclosed embodiments can be more fully understood with reference to FIGS. 1-5. FIG. 1 is a depiction of communication system 100 in accordance with a first embodiment of the present invention. Communication system 100 is a well-known Code Division Multiple Access (CDMA) system, specifically a CDMA 2000 system, which is based on the Telecommunications Industry Association/Electronic Industries Association (TIA/EIA) standard IS-2000, suitably modified to implement the present invention. (The TIA/EIA can be contacted at 2001 Pennsylvania Ave. NW, Washington, D.C. 20006). Alternative embodiments of the present invention may be implemented in communication systems that employ-other technologies such as WCDMA, HRPD, "iDEN," "WiDEN," GSM, GPRS, UMTS, and EDGE.

Figure 2:
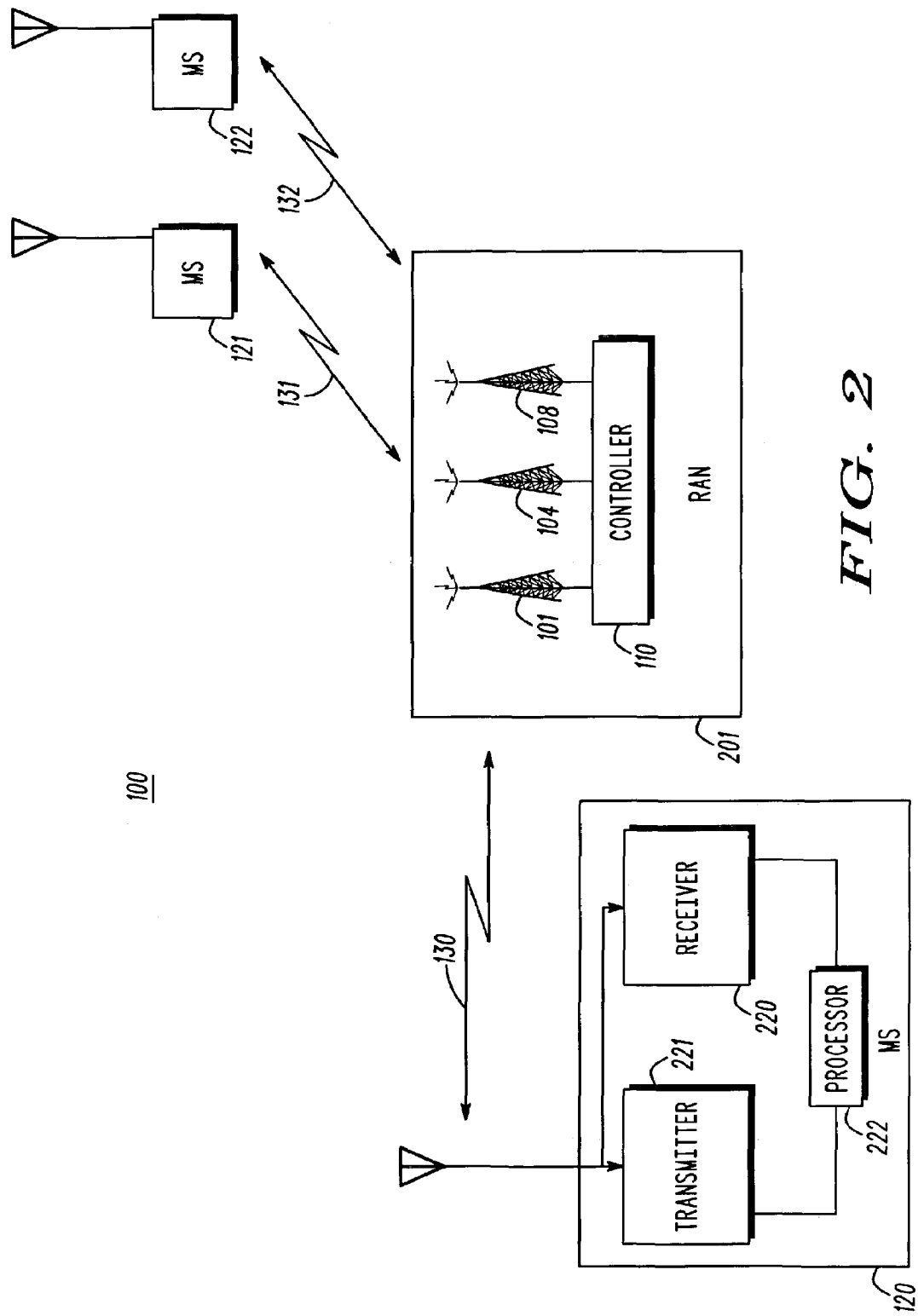
FIG. 2 is a block diagram depiction of the communication system and a mobile station (MS), in accordance with the first embodiment of the present invention.

Referring to both FIGS. 1 and 2, the first embodiment of the present invention includes radio access network (RAN) 201 and mobile stations (MSs) 120-122. Although depicted as mobile phones, MSs in the present invention are not limited to mobile phones. For example, an MS may comprise all manner of devices wirelessly connected to the radio access network such as computers, personal data assistants (PDAs), gaming devices, etc.

Those skilled in the art will recognize that FIGS. 1 and 2 do not depict all of the network equipment necessary for system 100 to operate but only those system components and logical entities particularly relevant to the description of embodiments of the present invention. For example, RAN 201 comprises well-known components such as fixed network equipment supporting each wireless coverage area, i.e., cell-site equipment 101-108. Since a wireless coverage area may refer to a cell or a sector of a cell, depending on the particular implementation, the term "cell" (or "cell-site") will be understood by those skilled in the art to refer to an individual sector within those cells that contain multiple sectors.

RAN 201 also comprises controller 110. Those skilled in the art are aware of the many ways each of these RAN entities can be implemented and/or purchased from wireless communications companies such as "MOTOROLA." Controllers, for example, typically comprise components such as processors, memory, and/or logic circuitry designed to implement algorithms that have been expressed as computer instructions and/or in circuitry. Given an algorithm or a logic flow, those skilled in the art are aware of the many design and development techniques available to implement a controller that performs the logic.

Typically, RAN cell-site equipment includes components such as RAN base transceiver stations (BTSs), which interface with other RAN devices such as base site controllers, mobile switching centers/virtual location registers (MSC/VLR), home location registers (HLR), etc. In a first embodiment of the present invention, a known CDMA 2000 RAN is adapted using known telecommunications design and development techniques to implement the RAN aspect of the present invention. The result is RAN 201. Those skilled in the art will recognize that the RAN aspect of the present invention may be implemented in and across various physical components of RAN 201.

RAN 201 communicates with MSs 120-122 via CDMA 2000 air interface resources 130-132. Resources 130-132 each-comprises a variety of well-known channel types, such as access channels, paging channels, and traffic channels. Some of these channels, such as traffic channels, are dynamically assigned and de-assigned to provide user services as requested and according well-known techniques and standards.

MS 120 comprises processor 222 (e.g., memory and processing devices), receiver 220, and transmitter 221. Transmitters, receivers, and processors as used in CDMA MSs are all well-known in the art. This common set of MS components is adapted using known telecommunications design and development techniques to implement the wireless unit aspect of the present invention. Thus modified, MS 120 performs the method described with respect to FIGS. 3-5.

Operation of communication system 100 in accordance with the first embodiment of the present invention occurs substantially as follows. Processor 222 of MS 120 monitors its own condition by determining whether either a low mobility condition or an active user messaging condition is present. The presence of either of these conditions triggers MS 120 to transition to one or more operational modes in which paging-related delays for MS 120 are reduced. Three of these operational modes are semi-dormant: mode, unslotted mode, and reduced slot cycle index (RSCI) mode. In semi-dormant mode, the MS performs periodic location updates. More specifically, the MS sends radio environment reports on its access channel so that the RAN can keep track of the MS's location and strong pilots. Thus, semi-dormant mode allows sending a paging channel message to the mobile without the page/page response cycle delay. In RSCI mode, the MS's slot cycle index is reduced (e.g., from SCI 2 to SCI 0). Thus, the MS checks its paging channel more often, reducing the PCH latency delay for the MS.

The low mobility condition is present for MS 120 when an idle handoff rate of the MS is less than or equal to an idle handoff rate threshold, such as less than 1 handoff per 3 minutes. In the first embodiment, the idle handoff rate threshold is received, via receiver 220, from RAN 201. Although this threshold may alternatively be pre-defined and thus remain relatively constant, greater efficiency can be achieved by making the threshold dynamic. Specifically, as access channel loading at MS 120's serving cell, cell-site equipment 101, increases, the idle handoff rate threshold is increased in order to reduce the additional access channel traffic caused by semi-dormant mobiles. Similarly, the idle handoff rate threshold is decreased when access channel loading decreases to allow more semi-dormant mobiles. Processor 222, via receiver 220, receives updates to the idle handoff rate threshold from RAN 201 via a signaling message on a paging/broadcast channel of air interface resource 130. Instead, if MS 120 happens to be active on a traffic channel, updates to the idle handoff rate threshold may also be received via a signaling message on the traffic channel of air interface resource 130.

In the case where MS 120 is making frequent idle handoffs but between the same cells, MS 120 is substantially stationary but will have a relative high idle handoff rate. Hence, the low mobility condition is also present for MS 120 when the MS has not performed idle handoff out of a zone designated by certain number of pilots for a certain period of time. For example, the low mobility condition is considered present for MS 120, if MS 120 has not monitored more than 3 pilots in the last 60 seconds.

In contrast to the low mobility condition, the active user messaging condition is present for MS 120 when MS 120 has recently (during the past ~70 seconds or 2 RF updates, for example) been involved in sending or receiving user messaging. Examples of user messaging include data burst messaging (such as short message service (SMS) messaging and short data burst (SDB) messaging), voice mail notification messaging, email notification messaging, and broadcast programming request messaging. Broadcast programming request messaging is included because such programming may need to be broadcast from multiple cells when the location of target mobiles is not known. Thus, it may be advantageous for these mobiles to operate in semi-dormant mode to keep the RAN apprised of, their location during such broadcasts. This would allow the RAN to send the programming only on a limited set of cells in the area of the mobile and to change the set of cells as the mobile moves.

The active user messaging condition is also present for MS 120 when the MS 120 becomes newly available to a group of associated communication devices, such as MS 120's messaging buddies. For example, if MSs 121 and 122 designate. MS 120 as one of their messaging buddies, then the period after MS 120 becomes newly available is a period of likely messaging between MSs 120-122. To announce its availability, such as after powering up or completing a call, processor 222, via transmitter 221, sends a presence update to RAN 201 indicating that its presence state has changed. In alternative embodiments, the active user messaging condition may only be present for a mobile when there are a threshold number of communication devices that designate the mobile as one of their messaging buddies or that there are a threshold number (or a threshold percentage) of these communication devices that are also available while the mobile is newly available.

The active user messaging condition is also present for MS 120 after MS 120 receives, via receiver 220, a recent read notification for messaging associated with MS 120. Such a read notification is an indicator that another user has accessed the messaging associated with MS 120. For example, when another user becomes aware of (e.g., enters for the first time the part of the phone menu where the notification is displayed), selects, or reads an email (SMS, etc.) or listens to a voice mail that was originated by or copied to MS 120, a read notification is received. Examples of messaging associated with MS 120 include, but are not limited to, data burst messaging (DBM) (such as SDB messaging and SMS messaging), voice mail messaging, e-mail messaging, presence messaging, and Caller ID messaging.

After determining that the active user messaging condition is present for MS 120, processor 222 transitions MS 120 to RSCI mode. Similarly, after determining that the low mobility condition is present for MS 120, processor 222 transitions MS 120 to semi-dormant mode. However, in a more restrictive alternative embodiment, the mobile transitions to semi-dormant mode only when both the low mobility condition and the active user messaging condition are present. Clearly then, MS 120 may be in both semi-dormant and RSCI mode simultaneously.

While each of these modes reduces paging-related delays for MS 120, they each deplete MS 120's battery life at a faster rate than typical idle operation does. Thus, processor 222 can exit either mode when remaining battery life for MS 120 falls below a power saving threshold, such as 25% of its battery life or 20 hours of standby time. In addition, processor 222 may only transition to a reduced delay mode when MS 120 has sufficient battery life remaining.

Since the reduced delay modes also impact serving cell capacity, processor 222 may only transition to certain modes (such as semi-dormant) when MS 120's serving cell indicates that it has sufficient unused capacity. For example, the serving cell can use an overhead message or an SMS message to broadcast an indication of its current unused capacity level.

To transition to a reduced delay mode, processor 222 requests, via transmitter 221, approval for the operational mode change from RAN 201. To proceed with the transition, processor 222, via receiver 220, needs to receive an indication that RAN 201 approves the operational mode change. This provides another opportunity or alternative for RAN 201 to prevent a mode change by a mobile when, for example, sufficient system capacity is not available.

It also enables RAN 201 to retain some control over aspects of the mobile operating modes. For example, MS 120 can request to transition to semi-dormant mode for a particular period of time or for a maximum number of reports. When MS 120 receives approval, RAN 201 can indicate complete approval, adjust the requested time period or number of reports, or specify a time period or number of reports where none was requested. Likewise, MS 120 can request to transition to RSCI mode for a particular period of time. The approval received by MS 120 may indicate complete approval, an adjusted period of time, or a specified period of time where none was requested.

Figure 3:
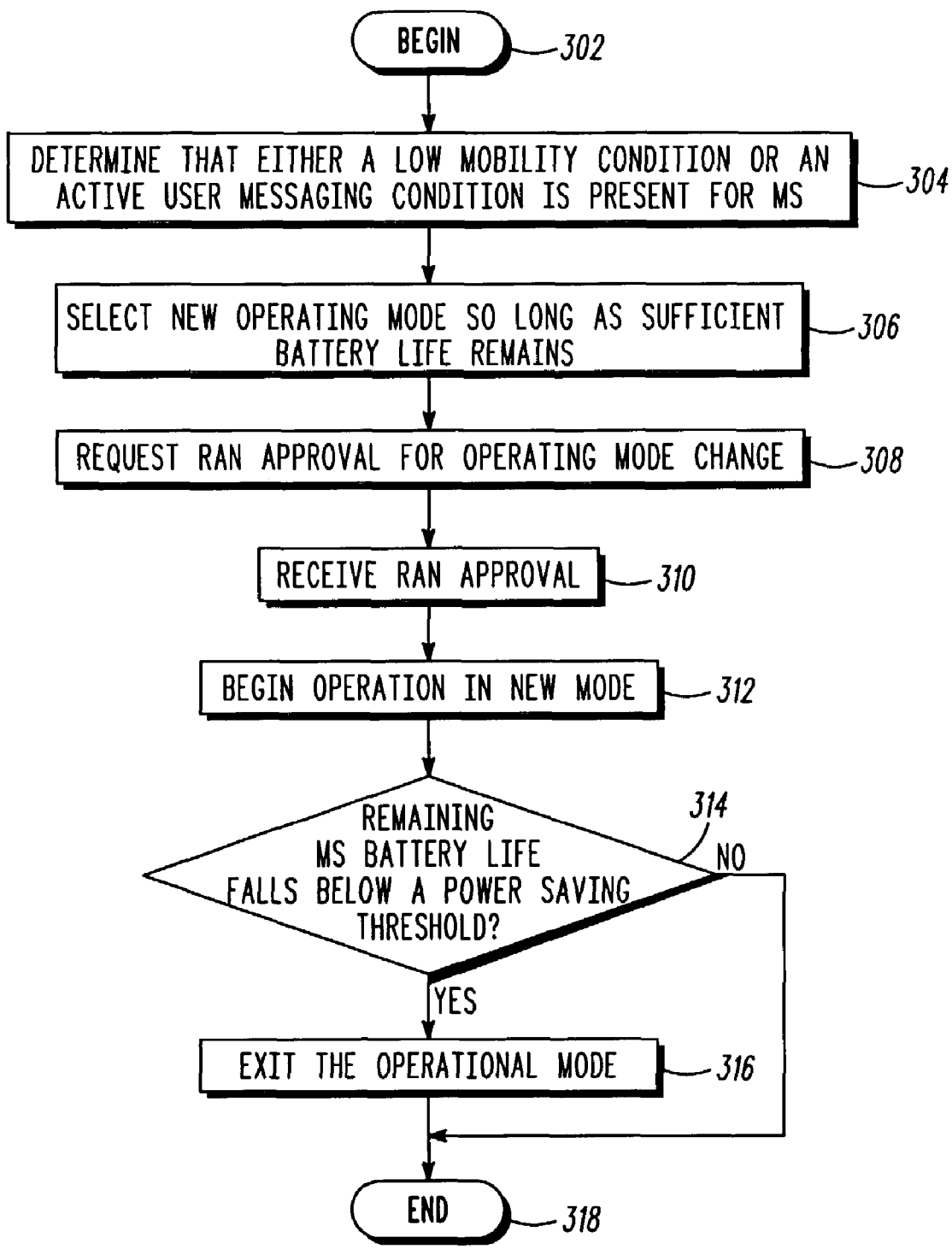
FIG. 3 is a logic flow diagram of functionality performed by an MS in accordance with the first embodiment of the present invention.
Figure 4:
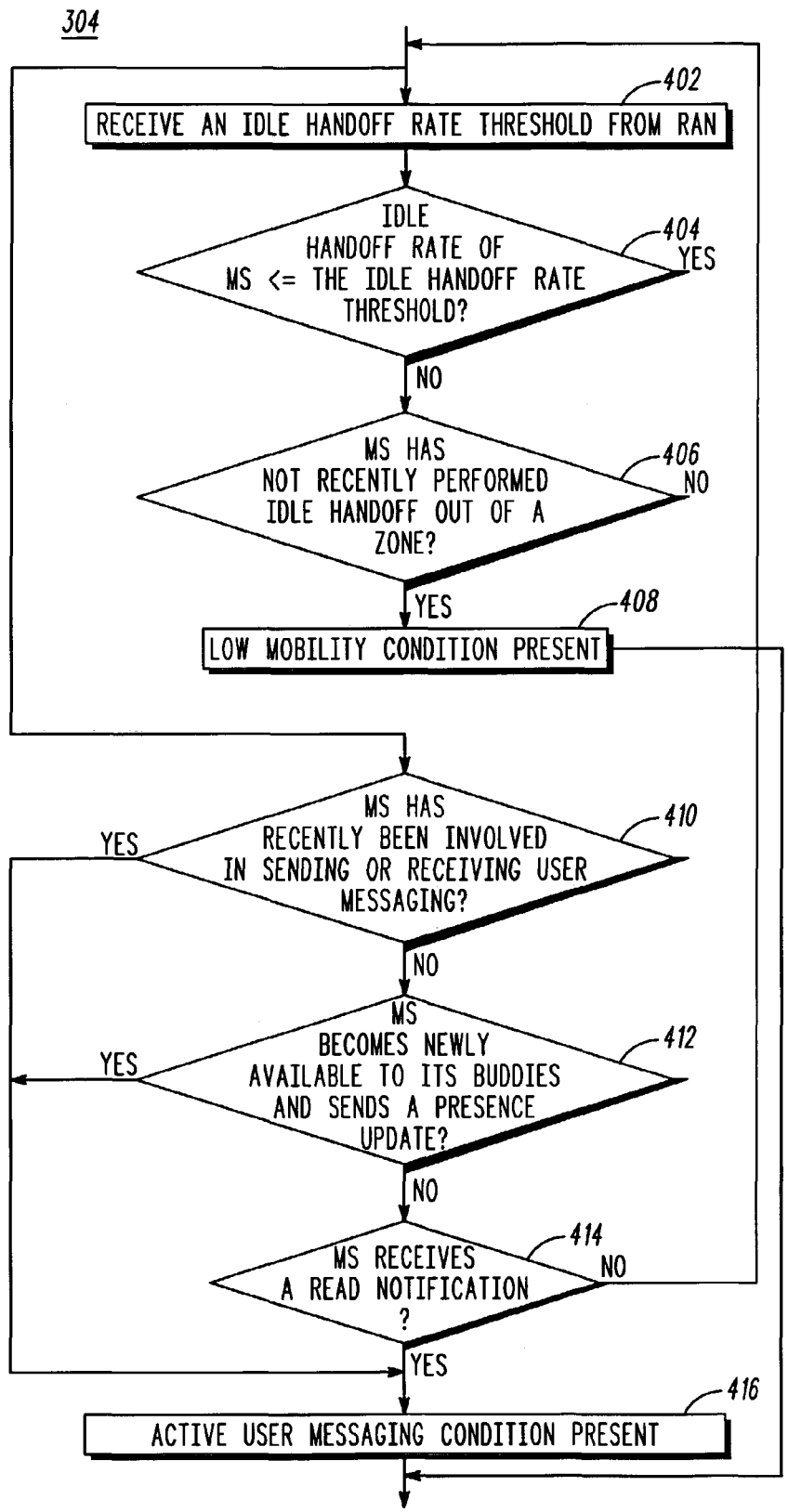
FIG. 4 is a logic flow diagram of determination functionality performed by the MS in accordance with the first embodiment of the present invention.
Figure 5:
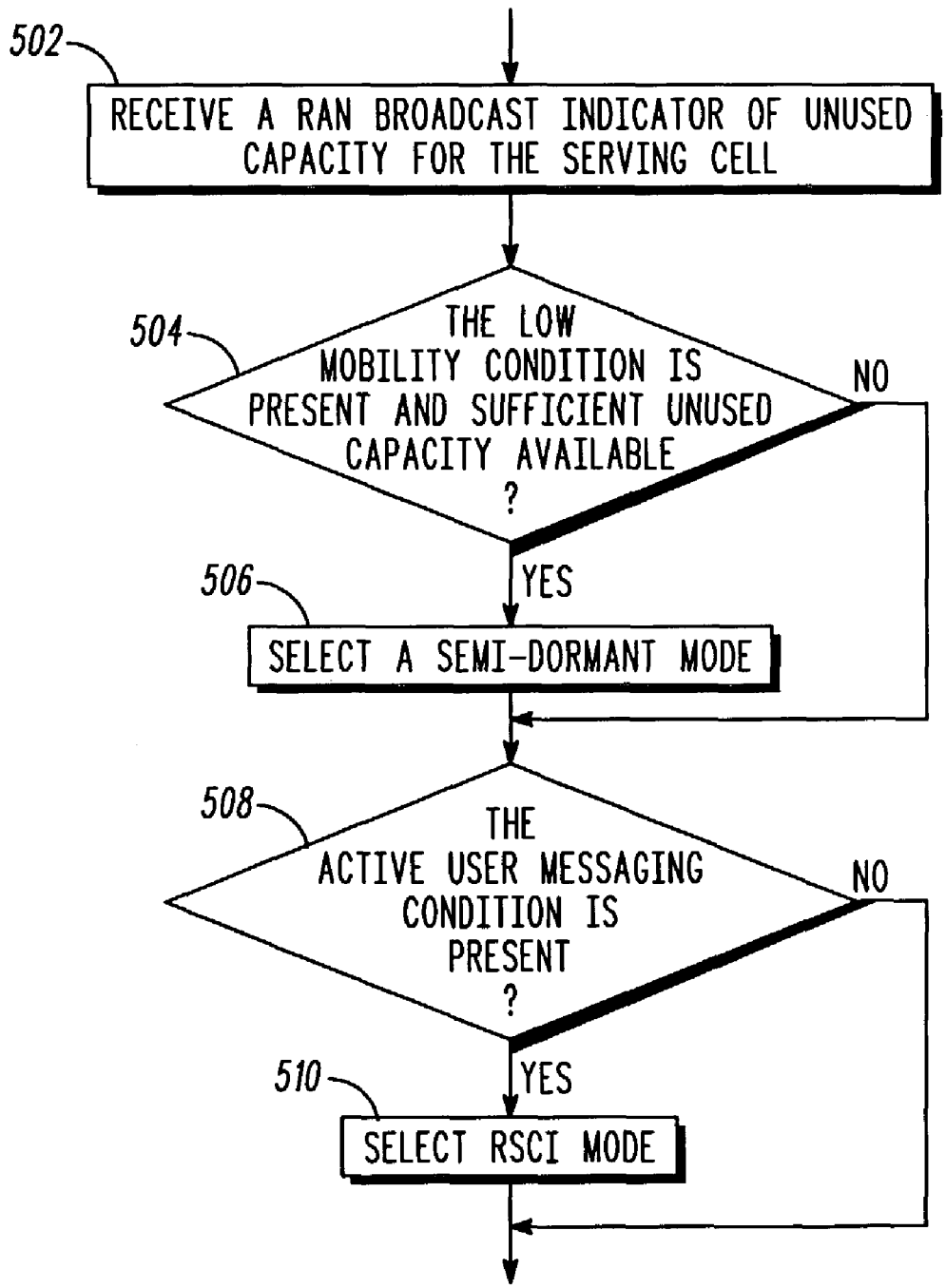
FIG. 5 is a logic flow diagram of selection functionality performed by the MS in accordance with the first embodiment of the present invention.

FIG. 3 is a logic flow diagram of functionality performed by an MS in accordance with the first embodiment of the present invention. Logic flow 300 begins (302) when the MS determines (304) that either a low mobility condition or an active user messaging condition is present for the MS. FIG. 4 depicts in greater detail the logic flow involved in this determination. So long as sufficient battery life remains, the MS then selects (306) a new operating mode. FIG. 5 depicts in greater detail the logic flow involved in this selection.

The MS then requests (308) RAN approval of the operating mode change, and after receiving (310) approval, begins operation in the new mode. However, if (314) the MS's battery life falls below a power saving threshold, the MS exits (316) the operational mode to conserve its battery life and logic flow 300 ends (318).

FIG. 4 is a logic flow diagram of the determination functionality (304) performed by the MS in accordance with the first embodiment of the present invention. Logic flow 304 has two concurrent branches as the MS determines that either a low mobility condition or an active user messaging condition (or both) is present for the MS.

On the low mobility path, the MS receives (402) an idle handoff rate threshold from the RAN and compares (404) its idle handoff rate to the threshold. If its idle handoff rate is less than or equal to the threshold, then the low mobility condition is present (408). If not, but (406) the MS has not recently performed an idle handoff outside of a particular zone of cells, the low mobility condition is present (408). Otherwise, the low mobility condition is not yet present.

On the active user messaging path, the active user messaging condition is determined to be present (416) when any of three triggers occur. The first trigger is when (410) the MS has recently been involved in sending or receiving user messaging. The second trigger is when (412) the MS becomes newly available to devices that designate the MS as a buddy and the MS sends a presence update. The third-trigger is when (414) the MS receives a read notification.

FIG. 5 is a logic flow diagram of the selection functionality (306) performed by the MS in accordance with the first embodiment of the present invention. In logic flow 306, the MS receives (502) an indicator, broadcast by the RAN, of serving cell capacity. If (504) the low mobility condition is present and sufficient unused capacity is available for semi-dormant mode, then semi-dormant mode is selected (506). If (508) the active user messaging condition is present, then RSCI is selected (510).

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language).

What is claimed is:

1. A method of reducing paging-related delays comprising:
   determining by a mobile station (MS) that at least one condition from the group consisting of a low mobility condition and an active user messaging condition is present for the MS; and
   transitioning, as triggered by the presence of the at least one condition, to at least one operational mode in which a period of paging-related delay for the MS is reduced, wherein the at least one operational mode comprises at least one MS mode from the group consisting of a semi-dormant mode, an unslotted mode, and a reduced slot cycle index (RSCI) mode.

2. The method of claim 1, wherein the low mobility condition is present for the MS when the MS has not performed idle handoff out of a zone designated by certain number of pilots for a certain period of time.

3. The method of claim 1, wherein the low mobility condition is present for the MS when an idle handoff rate of the MS is less than or equal to an idle handoff rate threshold.

4. The method of claim 3, further comprising receiving the idle handoff rate threshold from a radio access network (RAN).

5. The method of claim 4, wherein the idle handoff rate threshold indicates a loading level of a serving site access channel.

6. The method of claim 4, wherein receiving the idle handoff rate threshold from the RAN comprises receiving the idle handoff rate threshold via an overhead message on a paging/broadcast channel.

7. The method of claim 4, wherein receiving the idle handoff rate threshold from the RAN comprises receiving the idle handoff rate threshold via a traffic channel.

8. The method of claim 1, wherein the active user messaging condition is present when the MS has recently been involved in sending or receiving user messaging.

9. The method of claim 8, wherein user messaging comprises messaging from the group consisting of data burst messaging, short message service (SMS) messaging, short data burst (SDB) messaging, voice mail notification messaging, email notification messaging, and broadcast programming request messaging.

10. The method of claim 1, wherein the active user messaging condition is present when the MS becomes newly available to a group of associated communication devices, wherein each of the group of associated communication devices is related to the MS as a messaging buddy.

11. The method of claim 10, wherein the MS becomes newly available by performing at least one action from the group consisting of powering up, completing a call, and changing a presence state of the MS.

12. The method of claim 10, wherein the MS becomes newly available by sending a presence update to a radio access network (RAN) indicating that the MS is no longer in an offline presence state.

13. The method of claim 10, wherein the group of associated communication devices includes a threshold number of members.

14. The method of claim 10, wherein the group of associated communication devices includes a threshold number of available members.

15. The method of claim 10, wherein the group of associated communication devices includes a threshold percentage of available members.

16. The method of claim 1, wherein the active user messaging condition is present after the MS receives a recent read notification for messaging associated with the MS, wherein the read notification indicates that another user has accessed the messaging associated with the MS.

17. The method of claim 16, wherein the messaging associated with the MS comprises messaging from the group consisting of data burst messaging (DBM), short data burst (SDB) messaging, short message service (SMS) messaging, voice mail messaging, e-mail messaging, presence messaging, and Caller ID messaging.

18. The method of claim 1, further comprising: when remaining battery life for the MS falls below a power saving threshold, exiting the at least one operational mode in which paging-related delays for the MS are reduced.

19. The method of claim 18, wherein the MS exits semi-dormant mode by sending a report with an indicator that the report is a last report.

20. The method of claim 1, wherein the MS performs periodic location updates in the semi-dormant mode.

21. The method of claim 1, wherein transitioning comprises transitioning to a semi-dormant mode only when the low mobility condition is present for the MS, wherein the MS performs periodic location updates in the semi-dormant mode.

22. The method of claim 1, wherein transitioning comprises transitioning to a semi-dormant mode only when both the low mobility condition and the active user messaging condition is present for the MS, wherein the MS performs periodic location updates in the semi-dormant mode.

23. The method of claim 1, wherein transitioning comprises only transitioning to a reduced slot cycle index (RSCI) mode when the active user messaging condition is present for the MS.

24. The method of claim 1, wherein transitioning comprises:
   requesting approval for an operational mode change from a radio access network (RAN); and
   receiving an indication that the RAN approves the operational mode change.

25. The method of claim 24, wherein receiving the indication that the RAN approves comprises receiving an indication that the RAN approves of a mode change to a semi-dormant mode for a particular period of time, wherein the MS performs periodic location updates in the semi-dormant mode.

26. The method of claim 24, wherein receiving the indication that the RAN approves comprises receiving an indication that the RAN approves of a mode change to a semi-dormant mode for a maximum number of reports, wherein the MS performs periodic location updates in the semi-dormant mode.

27. The method of claim 24, wherein receiving the indication that the RAN approves comprises receiving an indication that the RAN approves of a mode change to a reduced slot cycle index (RSCI) mode for a particular period of time.

28. The method of claim 1, wherein transitioning comprises only transitioning as triggered by the presence of the at least one condition and further by an indication that a serving cell of the MS has sufficient unused capacity.

29. The method of claim 28, further comprising receiving, from a radio access network (RAN), a broadcast indication of unused capacity for the serving cell.

30. The method of claim 29, wherein the broadcast indication is communicated using a message from the group of messages consisting of an access parameters message and a broadcast short message service (SMS) message.

31. The method of claim 1, wherein transitioning comprises only transitioning as triggered by the presence of the at least one condition and further when the MS has sufficient battery life remaining.

32. A mobile station (MS) comprising:
   a transmitter;
   a receiver; and
   a processor, coupled to the transmitter and the receiver,
      adapted to determine that at least one condition from the group consisting of a low mobility condition and an active user messaging condition is present for the MS; and
      adapted to transition, as triggered by the presence of the at least one condition, to at least one operational mode in which a period of paging-related delay for the MS is reduced, wherein the at least one operational mode comprises at least one MS mode from the group consisting of a semi-dormant mode, an unslotted mode, and a reduced slot cycle index (RSCI) mode.

33. The MS of claim 32, wherein the MS performs periodic location updates in the Semi-dormant mode.

34. The MS of claim 32, wherein the low mobility condition is present for the MS when an idle handoff rate of the MS is less than or equal to an idle handoff rate threshold.

35. The MS of claim 32, wherein the active user messaging condition is present when the MS has recently been involved in sending or receiving user messaging.

36. The MS of claim 32, wherein the active user messaging condition is present when the MS becomes newly available to a group of associated communication devices, wherein each of the group of associated communication devices is related to the MS as a messaging buddy.

37. The MS of claim 32, wherein the active user messaging condition is present after the MS receives, via the receiver, a recent read notification for messaging associated with the MS, wherein the read notification indicates that another user has accessed the messaging associated with the MS.

38. The MS of claim 32, wherein the processor is further adapted to exit, the at least one operational mode in which paging-related delays for the MS are reduced, when remaining battery life for the MS falls below a power saving threshold.

39. The MS of claim 32, wherein transitioning comprises:
   requesting, via the transmitter, approval for an operational mode change from a radio access network (RAN); and
   receiving, via the receiver, an indication that the RAN approves the operational mode change.

* * * * *